May 26, 1964     J. C. HUBBART     3,134,189
HYDRO KITE ANGLING DEVICE

Filed Dec. 14, 1962     2 Sheets-Sheet 1

JASON C. HUBBART
INVENTOR

Huebner & Worrel
ATTORNEYS

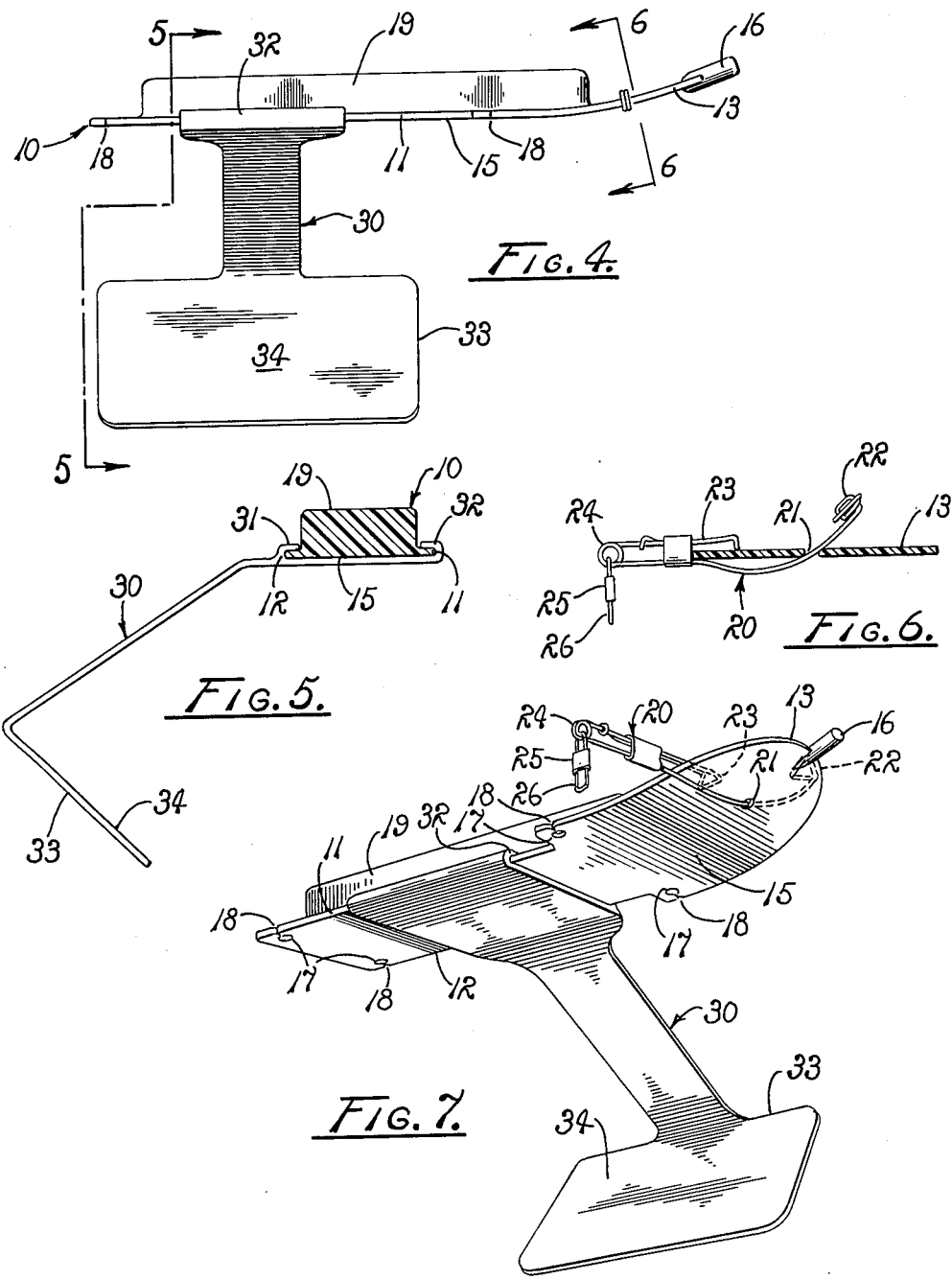

United States Patent Office 3,134,189
Patented May 26, 1964

3,134,189
HYDRO KITE ANGLING DEVICE
Jason C. Hubbart, 4640 E. Lowe, Fresno, Calif.
Filed Dec. 14, 1962, Ser. No. 244,622
4 Claims. (Cl. 43—43.13)

This invention relates to a hydro kite angling device adapted for use with a fishing line and various lures normally employed therewith. The invention particularly relates to such a device which is stable in operation, is adapted for use in a variety of angling conditions, and is automatically rendered inoperative during use following a successful strike by a fish.

In many fishing operations, particularly trolling and stream fishing, it is desirable to displace a fishing line and lure attached thereto to a position relative to the angler other than that which occurs from the natural resistance of the line and the lure to the relative motion of the water. For example, during trolling from a boat, a line and lure under normal circumstances assume a position substantially parallel to the direction of movement of the boat. When more than one person is trolling from the same boat, entanglement of their lines is a common occurrence when the lines are permitted to assume their natural trolling positions.

Similar conditions exist in stream or river fishing, wherein the lure is cast by an angler situated on one of the banks of the stream. The lure is then permitted to drift downstream until such time that it encounters a portion of the bank at a downstream position. The lure must then be retrieved through water adjacent to the bank, which may not necessarily be the area desired by the angler. Also, during each cast there is only a limited time period during which the lure can be maintained in an area suitable for fishing.

Previously available hydro kites have been utilized in an attempt to overcome these shortcomings. Many previously available kites have been found to be extremely limited in their utility and not adaptable to the variety of stream conditions normally encountered during use. Also, such devices have not been universally reliable and are incapable of positioning lures with precision in selected areas. In addition, many of the prior art devices have acted as a permanent drag load on fishing gear once a fish has engaged the lure. Obviously, such a condition is undesirable and unacceptable to most anglers.

Accordingly, it is an object of the present invention to provide a hydro kite angling device which is adaptable and reliable under a variety of operating conditions.

Another object is to provide such a device which is automatically rendered non-functional as a hydro kite upon a successful strike being made by a fish.

Another object is to provide a hydro kite angling device for use in conjunction with a fishing line and lure and which is quickly and readily adjustable to accommodate stream current velocity and direction relative to the angler using the device.

These, together with other objects, will become more fully apparent upon reference to the following description and accompanying drawings.

In the drawings:

FIG. 4 is a view in side elevation of the device shown in FIG. 3.

FIG. 5 is a transverse, vertical section taken on line 5—5 of FIG. 4.

FIG. 6 is a transverse, vertical section taken on line 6—6 of FIG. 4.

FIG. 7 is a perspective view of the device shown in FIG. 3.

Figure 3:
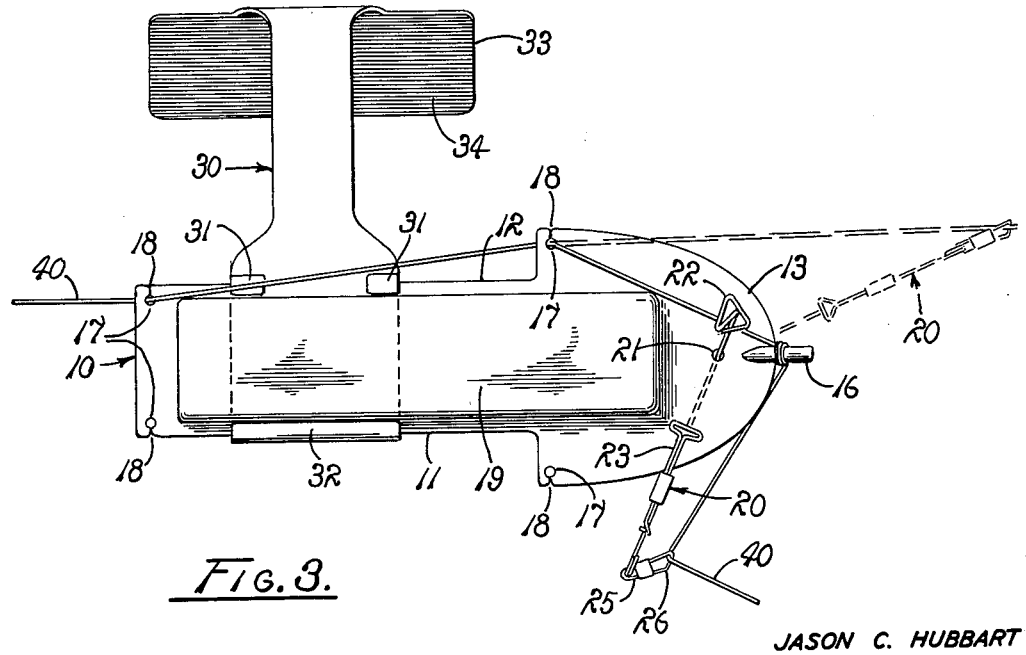
FIG. 3 is an enlarged, top plan view of the device of FIG. 1.

Referring more particularly to the drawings, a hydro kite angling device constructed according to the present invention is shown in FIG. 3 as comprising a body 10 having opposite sides 11 and 12. The body extends forwardly to form a prow portion 13.

As can be seen more clearly in FIGS. 4 and 7, the body is provided with a normally downwardly presented planing surface 15 disposed substantially in a single plane except for the curved portion of the planing surface carried by the prow 13. An anchorage post 16 extends forwardly from the prow in substantial alignment with the longitudinal axis of the body and is disposed substantially equidistantly between laterally opposed pairs of guide eyelets 17 provided at each side of the body. The guide eyelets 17 are aligned approximately longitudinally of the body 10 and are in the form of apertures provided with respective narrow entry throats 18. Rigidly secured to the upper side of the body is a float 19 having a displacement proportioned according to the gross weight of the device.

An elongated bridle arm 20 is slidably threaded through an aperture 21 provided in the prow in longitudinal alignment with the post 16. A stop 22 is fixed to the inner end of the arm and permits pivotal movement between the arm and the body 10 and also limits the longitudinal extension of the arm. A clamping jaw 23 is carried at the outboard end of the arm and is adapted to grip the body by frictionally engaging the body between the jaw and the arm 20. The extreme outboard end of the arm is provided with a loop 24 for universally mounting on the arm a swinging guide 25.

An outrigger arm 30 is provided with laterally opposed gripping flanges in the form of tabs 31 and a return-bent flange 32 integral with the arm. The pair of tabs and the flange 32 are spaced to receive therebetween the body 10 thereby to permit selective longitudinal adjustment of the outrigger arm therealong. In addition to such longitudinal adjustment, the outrigger arm 30 may be removed from the body 10 and projected from the side opposite from that illustrated in the drawings. The outrigger arm 30 carries at its distal end a reaction member 33 having a plane surface 34 disposed substantially parallel to the longitudinal axis of the body member and angularly related to the planing surface 15. In a commercial embodiment of the device, the outrigger arm and the reaction member are integrally formed from a single sheet of lightweight, non-corrodible, flexible metal, such as aluminum. Since the device can be bent, the angular relationship between the plane surface 34 and the surface 15 may be selectively adjusted to accommodate the particular stream velocity encounted. As can be seen clearly in FIGS. 4 and 5, the reaction member is disposed at a level below the plane of the surface 15. It is also significant that the outrigger arm 30 have sufficient area to have a vaning effect to preclude the reaction member 33 from pivoting the kite downwardly excessively about the longitudinal, or roll, axis of the hydro kite. For optimum operation, the surface 15 should afford an area larger than the surface 34, and the surface 34 should likewise be larger than the downwardly presented reaction surface of the outrigger arm 30.

Operation

Figure 1:
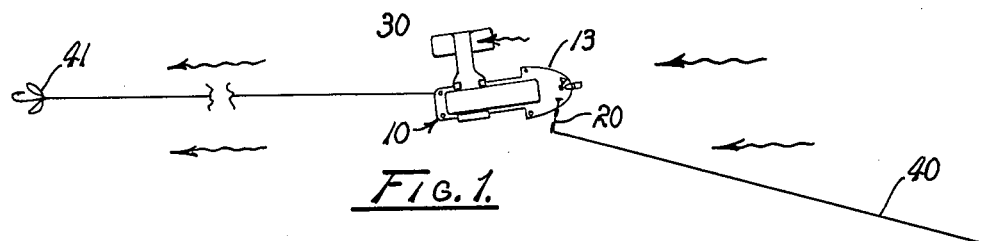
FIG. 1 is a schematic view showing a hydro kite angling device embodying the principles of the present invention in use in a stream.
Figure 2:
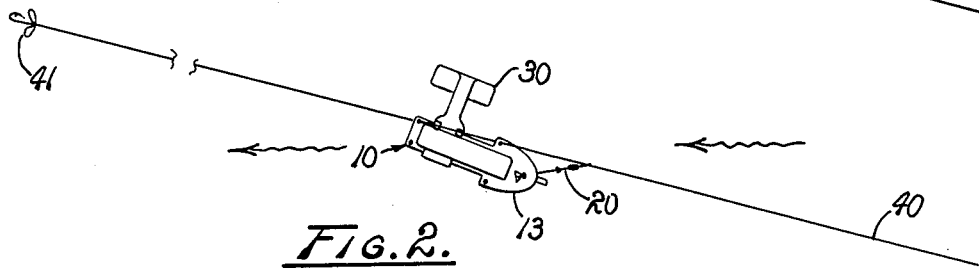
FIG. 2 is a similar view showing the device of FIG. 1 rendered inoperative under certain conditions which will subsequently be described.

The operation of the described embodiment of the subject invention is believed to be readily apparent and is briefly summarized at this point. Assuming that the device of the present invention is to be employed in a stream having a current direction moving from right to left, as viewed in FIGS. 1 and 2, the outrigger is mounted on the body member to project from the left side thereof, as viewed in FIG. 3. A fishing line 40, to which an appropriate lure 41 has been secured, is then slidably received in the pair of guide eyelets on that side of the body member from which the outrigger arm 30 projects. The narrow throat 18 of each eyelet 17 permits the admission of the line, while the eyelets themselves are proportioned for free running of the line therethrough. The device is then releasably secured to the line at a selected distance from the lure by releasably wrapping the line about the post 16 and threading it through the swinging guide 25. A commercially available snap hook 26 facilitates the entry of the line through the guide 25. The bridle arm 20 is then swung to the side of the body 10 opposite from the eyelets through which the line is threaded and is releasably engaged with the body by the clamping jaw 23. Since the arm 20 is mounted for both sliding and pivotal movement through the aperture 21, a variety of longitudinal and lateral positions on the body member for the clamping jaw 23 is permitted. Accordingly, the bridle formed by the line 40 in conjunction with the post 16, the arm 20, and the guide 25 may be proportioned to fit any stream current velocity and direction encountered by the angler, thereby permitting precise positioning of the lure in the stream. With optimum adjustment, the kite can be caused to draw the line across a moving stream at a relative angle, between the line and the direction of movement of the stream, in excess of 60°. For example, a fisherman standing on the bank of a stream can easily cause the lure to move out in the stream forty feet or so while letting out only fifty feet of line.

In addition to the selective adjustability of the bridle, the outrigger may be positioned longitudinally of the body 10 as well as disposing the surface 34 elevationally with respect to the planing surface 15 and adjusting the angular relationship between those surfaces. During use of the present device, it has been found to be most effective when the plane surface 34 is disposed at a level below the plane of surface 15, acutely angularly related thereto, and parallel to the longitudinal axis of the body. This prevents the hydro kite from rocking excessively in swift, choppy water, and enhances the stability of the device.

By judicious positioning of the adjustable clamping jaw 23 in relation to the position of the outrigger 30 and reaction member 33 relative to the body 10, the device can be utilized to position the lure 41 in any desired location within practical range regardless of the location of the angler and the velocity of the stream current. Normally, the planing surface 15 is effective to maintain the device substantially at the surface of the water. However, in certain cases, the float 19 enhances the buoyancy of the device, and insures its remaining on the water surface in still or slow moving water. In fast moving streams, the plane surfaces 34 and 15 and the downwardly facing reaction surface afforded by the outrigger arm 30 are effective to impart the stability desired. Surface 34 maintains surface 15 in contact with the upper surface of the water and reduces the tendency to pitch and skip, while the reaction surface of arm 30 reduces the rolling tendency of the kite.

Upon a successful strike being made on the lure by a fish, the angler can readily render the device ineffective by exerting on the line 40 a force exceeding a predetermined value. Such a force disengages the clamping jaw 23 from the body 10 and permits the line 40 to be released from the post 16. Consequently, the bridle arm 20 is extended and pivots relative to the body to a position shown in dash lines in FIG. 3. In such a position, the device is then free to slide along the line until contacting the lure 41, or any leader, not separately shown, which may be used by the angler. With the line and bridle in the position shown in dash lines, the device offers substantially no resistance to retrieval of the fish. Accordingly, upon such retrieval, the device may be readily returned to the condition shown in full lines and is again suitable for use in the stream.

Although shown in conjunction with a single line and employed in stream fishing, the present invention has utility in other fishing environments, wherein the body of water has motion relative to the lure, such as in trolling operations. The device may also be employed in fishing operations wherein the lure is attached to a second line supported from the line 40 and selectively positioned therealong. Such variations in use will occur to those skilled in the art of employing hydro kite devices.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A hydro kite angling device comprising a substantially rigid body member having a prow and a longitudinal axis and affording a downwardly presented longitudinally extended planing surface; outrigger means extended laterally from said body member and providing opposite proximal and distal ends; a reaction member fixed to the distal end of said outrigger means and affording a plane surface disposed substantially parallel to the longitudinal axis of said body member and angularly related to the planing surface thereof; bridle means adapted to transmit an external force to said body member and to direct such force along a line of action away from said reaction member and angularly related to said longitudinal axis; and means connecting said bridle means to said body member, including frictional engaging means releasably gripping the body member and disengageable therefrom upon said external force exceeding a predetermined value, and a buoyant member secured to said body member at an elevational position above said planing surface.

2. A hydro kite angling device comprising a substantially rigid body member having a prow and a longitudinal axis and affording a downwardly presented longitudinally extended planing surface and being provided with longitudinally spaced line guide means disposed laterally of the central longitudinal axis of the body member; outrigger means providing an outboard end; means mounting the outrigger means on the body member for selective longitudinal positioning thereon; a reaction member fixed to the outboard end of said outrigger means and affording a plane surface disposed substantially parallel to the longitudinal axis of said body member and angularly related to the planing surface thereof; and anchorage post extended forwardly from the body member substantially centrally of the lateral limits thereof; a longitudinally extended bridle arm having one end pivotally secured to the body member; gripping means carried at the opposite end of said arm adapted for frictional engagement with said body member; and a swinging guide carried at the distal end of said arm for universal motion thereon including means to receive a fishing line slidably therethrough.

3. In combination with a fishing line, a hydro kite angling device comprising a substantially rigid body member having opposite lateral edges and a longitudinal axis and affording a downwardly presented longitudinally extended planing surface, and provided with substantially longitudinally aligned guide eyelets longitudinally spaced along each of said lateral portions; outrigger means laterally and downwardly extended from the body member and providing a distal end; means mounting the outrigger on the body member for selective longitudinal positioning therealong and for selective lateral projection therefrom; a reaction member fixed to the distal end of said outrigger and affording a plane surface disposed substantially parallel to the longitudinal axis of said body member and acutely angularly related to the planing surface thereof; an anchorage post extended forwardly from the body member and substantially centrally of said laterally opposed guide eyelets; a longitudinally extended bridle arm providing an outboard end; means substantially longitudinally aligned with said post for pivotally mounting said bridle arm on said body member; frictional engaging means carried at the outboard end of said arm for releasably gripping the body member at the lateral portion thereof and being adapted for disengagement therefrom upon a predetermined value of force being exerted thereagainst; and a swinging guide mounted at the outboard end of said arm adapted to receive a fishing line therethrough in guiding relationship whereby the fishing line threaded through the guide eyelets at one side of the body member and releasably wrapped about said post in conjunction with said arm projected laterally oppositely from the guide eyelets slidably receiving the line thereby provides a bridle adapted to transmit an external force to said body member and to direct such force along a line of action away from said reaction member and angularly related to said longitudinal axis.

4. A hydro kite angling device for use with a fishing line and comprising a body member having a prow, laterally opposed edges and a longitudinal axis and affording a downwardly presented longitudinally extended planing surface and having respective pairs of line guiding eyelets provided on opposite lateral positions thereof, the body member including an upwardly curved prow portion; an anchorage post forwardly projecting from said prow portion and disposed in substantial alignment with the longitudinal axis of said body member; and outrigger providing a distal end and having opposed gripping flanges slidably to receive the body member for selective longitudinal positioning of the outrigger therealong; a reaction member fixed to the distal end of said outrigger and affording a plane surface disposed substantially parallel to the longitudinal axis of said body member, acutely angularly related to the planing surface thereof, and disposed at a level below the plane of said planing surface, a longitudinally extended bridle arm providing an outboard end; means mounting the bridle arm for pivotal movement on the prow portion, including means permitting longitudinal movement of the arm relative to the body member; a clamping jaw carried at the outboard end of said arm and adapted for frictional engagement with a lateral portion of said bridle member; a swinging guide carried at the outboard end of said arm and adapted to receive a fishing line slidably therethrough in guiding relationship; and a buoyant member fixed to the upper side of said body member, said fishing line when threaded through the guide eyelets at one side of the body member releasably wrapped about said post and threaded through said swinging guide forms a bridle in conjunction with said arm adapted to transmit an external force to said body member and to direct such force along a line of action away from said reaction member and angularly related to said longitudinal axis and also permits disengagement of the clamping jaw upon said external force exceeding a predetermined value to render the device ineffective in displacing the line.

References Cited in the file of this patent

UNITED STATES PATENTS

| | | |
|---|---|---|
| 2,111,958 | Bardon | Mar. 22, 1938 |
| 2,189,958 | Middlemiss | Feb. 13, 1940 |
| 2,615,276 | Kissich | Oct. 28, 1952 |
| 2,739,406 | Nunnally | Feb. 13, 1956 |
| 2,942,371 | Johnson et al. | June 28, 1960 |
| 3,023,537 | Madson | Mar. 6, 1962 |